United States Patent
Hovda et al.

(10) Patent No.: US 10,389,395 B1
(45) Date of Patent: Aug. 20, 2019

(54) RADIO FREQUENCY ACTIVE FILTER

(71) Applicant: Rockwell Collins, Inc., Cedar Rapids, IA (US)

(72) Inventors: Donald F. Hovda, Cedar Rapids, IA (US); Chenggang Xie, Marion, IA (US); Anders P. Walker, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/050,138

(22) Filed: Feb. 22, 2016

(51) Int. Cl.
*H04B 1/10* (2006.01)

(52) U.S. Cl.
CPC ......... *H04B 1/1018* (2013.01); *H04B 1/1081* (2013.01)

(58) Field of Classification Search
CPC ...... H04B 1/1018; H04B 1/1081; H04B 1/10; H04B 1/109
See application file for complete search history.

(56) References Cited

U.S. PATENT DOCUMENTS

| | | | | |
|---|---|---|---|---|
| 5,939,918 A * | 8/1999 | McGarry | ............... | H03H 11/20 327/246 |
| 6,553,216 B1 * | 4/2003 | Pugel | ............... | H03D 7/18 455/195.1 |
| 2002/0014672 A1 * | 2/2002 | Noble | ............... | H01L 21/28044 257/413 |
| 2008/0001731 A1 * | 1/2008 | Eskildsen | ............... | G08B 25/10 340/539.1 |
| 2010/0003943 A1 * | 1/2010 | Seendripu | ............... | H03D 3/007 455/314 |
| 2010/0244903 A1 * | 9/2010 | Easton | ............... | H03D 7/163 327/105 |
| 2011/0117870 A1 * | 5/2011 | Pera | ............... | H04B 1/1036 455/307 |
| 2013/0221211 A1 * | 8/2013 | Witzens | ............... | H04B 10/58 250/227.11 |
| 2014/0171001 A1 * | 6/2014 | Fernando | ............... | H04B 17/21 455/226.1 |
| 2014/0171006 A1 * | 6/2014 | Murphy | ............... | H04B 15/06 455/296 |
| 2016/0218673 A1 * | 7/2016 | Anderson | ............... | H03D 7/14 |

OTHER PUBLICATIONS

Rameswor Shrestha et al., A Polyphase Multipath Technique for Software-Defined Radio Transmitters, IEEE Journal of Solid-State Circuits, vol. 41, No. 12, Dec. 2006, pp. 2681-2692.

* cited by examiner

*Primary Examiner* — Nguyen T Vo
(74) *Attorney, Agent, or Firm* — Angel N. Gerdzhikov; Donna P. Suchy; Daniel M. Barbieri (57) ABSTRACT

Active filters that may be utilized in various types of radio devices (e.g., receivers and/or transmitters) are disclosed. In some implementations, high dynamic range mixers implementing a polyphase multipath approach may be utilized in the active filters. Such mixers may satisfy the high dynamic range and image suppression requirements when they are configured for radio frequency applications.

16 Claims, 6 Drawing Sheets

RADIO FREQUENCY ACTIVE FILTER

BACKGROUND

Radio system performance and architectures are highly dependent on filter technologies. In a superheterodyne radio, for example, high levels of selectivity are created through the use of one or more Intermediate Frequency (IF) sections with decreasing bandwidths that are largely dictated by the filter technologies available. LC circuit filters, bulk acoustic wave filters, or ceramic filters may be utilized at higher frequencies in a radio while surface acoustic wave or crystal filters may be used to provide the final analog bandwidth for that radio.

One of the measurements used for filter selectivity is the loaded Q (quality) factor, defined as the filter's center frequency divided by its bandwidth. It is noted that current technologies used to construct the various filters mentioned above have limited loaded Q factors, which may limit the dynamic range of such filters. Additionally, since the final analog selectivity is not obtained until the final IF, circuits handling the signals prior to the final analog selectivity must accommodate the desired signal as well as all interfering signals. Since interfering signals falling within the widest front end filters will be amplified along with the desired signals, the dynamic range requirements of the front end circuits are further increased.

SUMMARY

In one aspect, embodiments of the inventive concepts disclosed herein are directed to an apparatus. The apparatus may include a first mixer and a second mixer both in communication with an oscillator. The apparatus may also include one or more filters positioned between the first mixer and the second mixer. The first mixer may be configured to convert an input signal to a converted signal and provide the converted signal to the filter(s). The second mixer may be configured to receive the converted signal filtered by the filter(s) and produce an output signal by reversely converting the filtered signal to an original frequency of the input signal.

In a further aspect, embodiments of the inventive concepts disclosed herein are directed to an apparatus. The apparatus may include a first mixer and a second mixer both in communication with an oscillator. The apparatus may include multiple filters positioned between the first mixer and the second mixer. The first mixer may be configured to convert an input signal to a converted signal and provide the converted signal to a selected filter of the multiple filters. The second mixer may be configured to receive the converted signal filtered by the selected filter and produce an output signal by reversely converting the filtered signal to an original frequency of the input signal.

In another aspect, embodiments of the inventive concepts disclosed herein are directed to an apparatus. The apparatus may include an oscillating signal distributor in communication with an oscillator. The oscillating signal distributor may be configured to generate distributed oscillating signals across multiple paths. The apparatus may also include multiple phase shifters configured to phase shift the distributed oscillating signals. The apparatus may also include multiple mixers configured to mix the distributed oscillating signals and an input signal to generate multiple intermediate frequency signals. The apparatus may further include a combiner configured to combine the intermediate frequency signals into an integrated intermediate frequency signal.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to active filters that may be utilized in various types of radio devices (e.g., receivers and/or transmitters). In some embodiments, high dynamic range mixers implementing a polyphase multipath approach may be utilized in the active filters. Such mixers (may be referred to as high dynamic range polyphase mixers) may satisfy the high dynamic range and image suppression requirements when they are configured for radio frequency applications.

Figure 1:
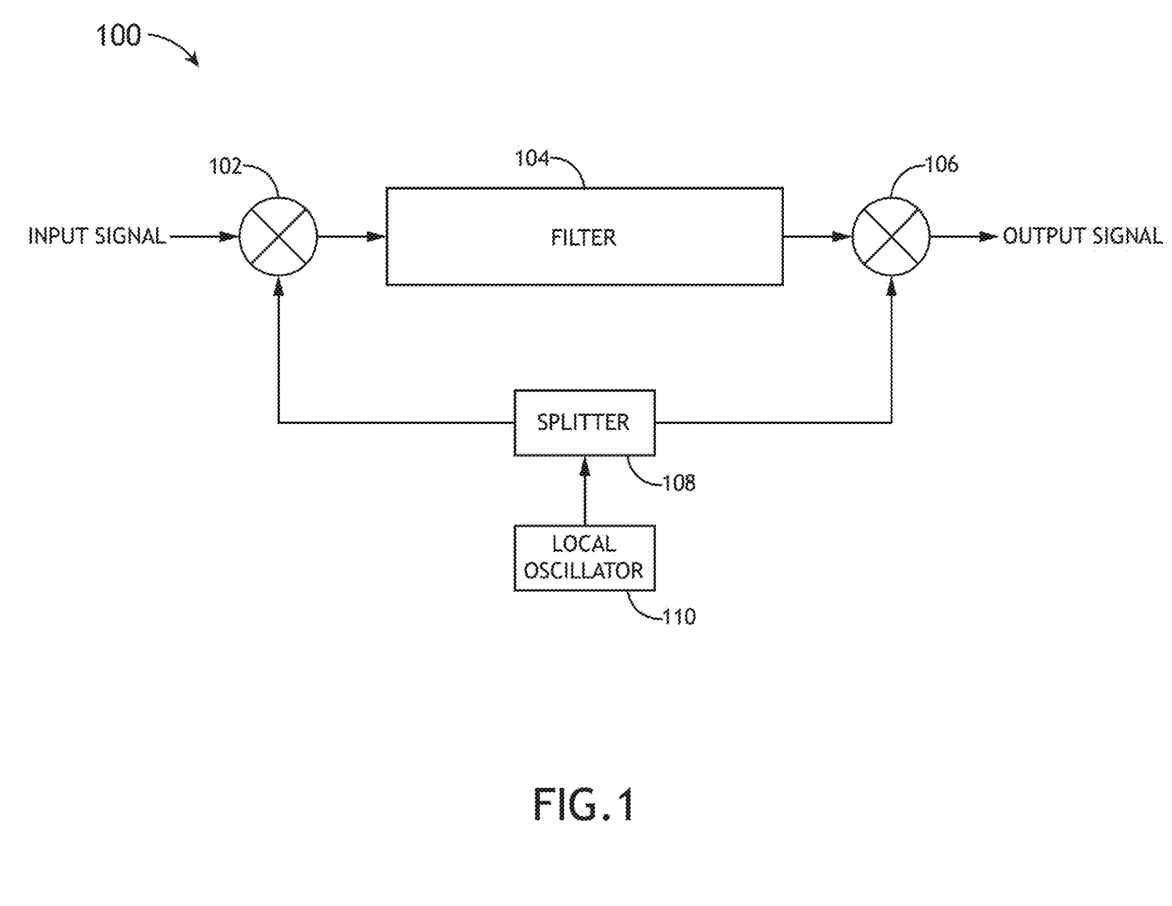
FIG. 1 is a block diagram of an exemplary active filter assembly according to an exemplary embodiment of the inventive concepts disclosed herein.

Referring generally to FIG. 1, a block diagram of an exemplary active filter assembly 100 configured in accordance with an embodiment of the inventive concepts disclosed herein is shown. The active filter assembly 100 configured in this manner may allow the desired signal to pass while effectively rejecting the interfering signals. More specifically, the active filter assembly 100 may include a first mixer 102 and a second mixer 106 both in communication (via a splitter 108) with a shared local oscillator 110. In other words, both the first mixer 102 and the second mixer 106 may receive the same oscillating signal from the shared local oscillator 110. The first mixer 102 may be configured to convert (e.g., down-convert or up-convert) a desired frequency band to the center frequency of a filter 104. The filter 104 may filter out the interfering signals and provide only the desired signal to the second mixer 106. The second mixer 106 may reverse the conversion of the desired signal (e.g., up-convert or down-convert, depending on the conversion performed by the first mixer 102) back to the original frequency. The reversely-converted signal may be provided as the output of the active filter assembly 100.

Figure 2:
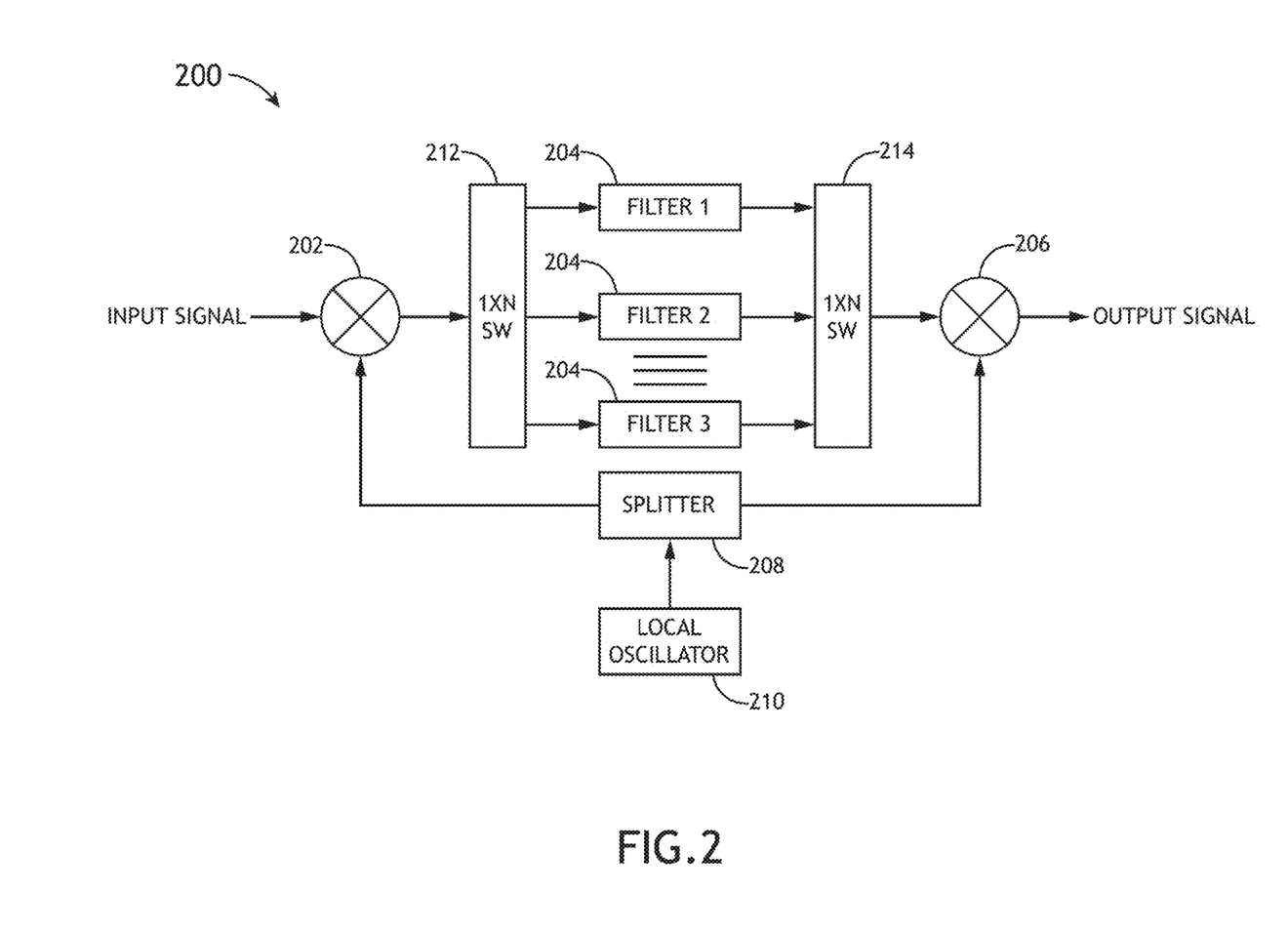
FIG. 2 is a block diagram of another exemplary active filter assembly according to an exemplary embodiment of the inventive concepts disclosed herein.

Referring now to FIG. 2, a block diagram of another exemplary active filter assembly 200 configured in accordance with an embodiment of the inventive concepts disclosed herein is shown. Similar to the active filter assembly 100 described above, the active filter assembly 200 may include a first mixer 202 and a second mixer 206 both in communication (via a splitter 208) with a shared local oscillator 210. It is noted, however, that the active filter assembly 200 may be configured to include a plurality of filters 204 coupled to a pair of switches 212 and 214.

It is contemplated that by having access to the plurality of filters 204, the active filter assembly 200 may be configured to support a wide range of bandwidths and filter center frequencies. The active filter assembly 200 may only need to select an offset in the frequency of the local oscillator 210, which may enable the active filter assembly 200 to select and use one of the plurality of filters 204.

It is also contemplated that the selected filter 204 positioned between the first mixer 202 and the second mixer 206 may function in a manner similar to that described above. More specifically, the first mixer 202 may be configured to convert (e.g., down-convert or up-convert) a desired frequency band to the center frequency of the selected filter 204. The selected filter 204 may filter out the interfering signals and provide only the desired signal to the second mixer 206. The second mixer 206 may convert the desired signal back to the original frequency (e.g., up-convert or down-convert, depending on the conversion performed by the first mixer 202). The reversely-converted signal may be provided as the output of the active filter assembly 200.

It is further contemplated that the active filter assembly 200 may support mixed signal implementations that can be used to implement narrowband filtering, with analog-to-digital converters (ADCs) and digital-to-analog converters (DACs) used in combination with digital filtering to create sharp filters with flat group delay. The speed of the filter architecture enabled by the active filter assembly 200 is only dependent on the tune speed of the local oscillator 210, the speed of the switches 212 and 214, and the rise time of the filters 204. For instance, in an exemplary case, the use of a filter with a 100 Hz bandwidth at 5 GHz has a loaded Q factor of 50 million. Such selectivity numbers are not achievable using conventional approaches.

It is noted that the active filter assemblies 100/200 configured in accordance with the inventive concepts disclosed herein may provide several other features in additional to the increased selectivity numbers. For instance, the isolation between the signal path and the local oscillator distribution may be utilized to preserve the inherent selectivity of the filter(s) 104/204. The phase noise of the local oscillator 110/210 requirements may also be relaxed in many instances because phase perturbations placed onto the desired signal in the first mixer 102/202 can be effectively cancelled in the second mixer 106/206. The second mixer 106/206 may also be utilized to suppress images that may occur on the output signal, which may be appreciated in various operating conditions.

It is also noted, however, that there are several architectural considerations that may need to be addressed. For instance, the first mixer 102/202 may need to be implemented to effectively suppress image responses. Additionally, it may be beneficial for the first mixer 102/202 to have high dynamic range as they will be subjected to a wide range of frequencies passing through. Should a low-noise amplifier be required, the dynamic range of the first mixer 102/202 may need to be further increased by the amount of amplifier gain.

Figure 3:
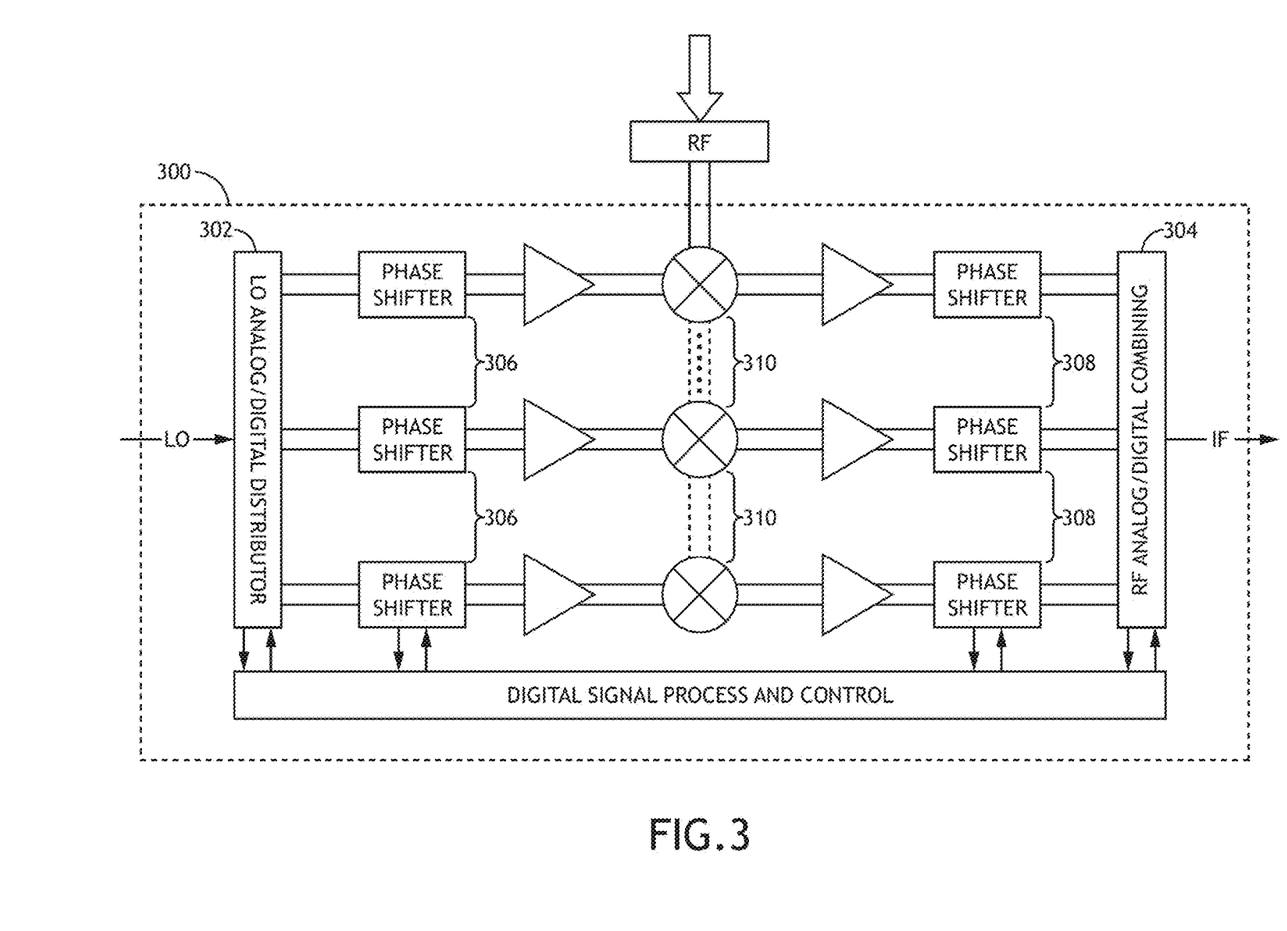
FIG. 3 is a block diagram of an exemplary polyphase multipath mixer according to an exemplary embodiment of the inventive concepts disclosed herein.

In some embodiments, a type of mixers referred to as polyphase multipath mixers may be utilized to satisfy the high dynamic range and image suppression requirements established for the mixers 102/202 and/or 106/206 depicted in FIGS. 1 and 2. FIG. 3 is a block diagram illustrating an exemplary polyphase multipath mixer 300 configured in accordance with an embodiment of the inventive concepts disclosed herein. As shown in FIG. 3, the polyphase multipath mixer 300 may utilize signal distributors 302 to distribute local oscillator (LO) signals received across multiple paths. The signals distributed across the different paths may be phase shifted using phase shifters 306 before being provided to their corresponding mixers 310. The mixes 310 may be configured to convert radio frequency (RF) signals received to intermediate frequency (IF) signals, which may then be shifted using phase shifters 308 and combined into an integrated IF signal using a combiner 304.

Figure 4:
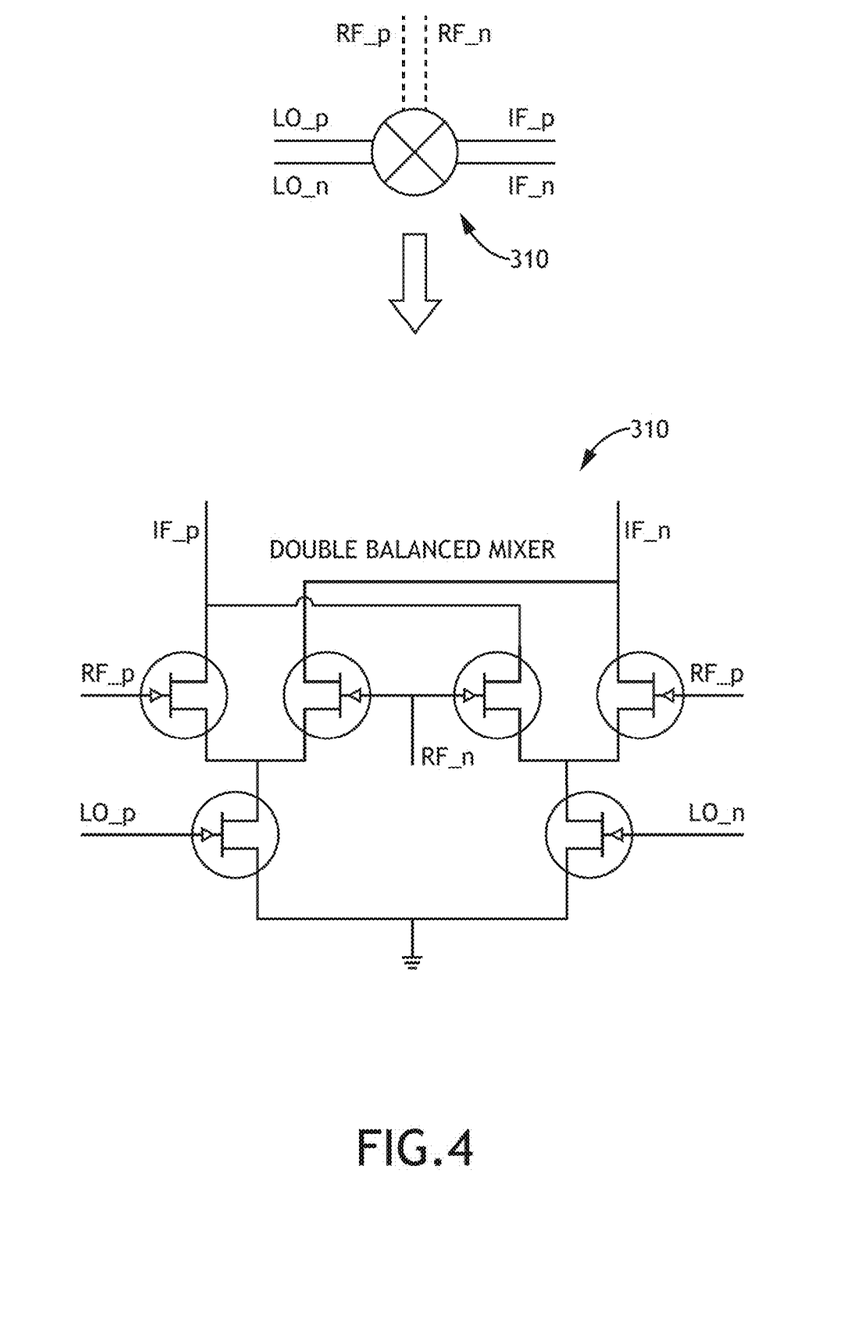
FIG. 4 is an illustration of an exemplary double balanced mixer utilized in an exemplary polyphase multipath mixer according to an exemplary embodiment of the inventive concepts disclosed herein.

In some embodiments, the mixers 310 may be configured as double balanced mixers 310 each configured to process two paths. An example of such a double balanced mixer 310 is illustrated in FIG. 4. More specifically, the double balanced mixer 310 may be configured to process the local oscillator (LO) and the radio frequency (RF) signals in pairs, denoted as LO_p/LO_n and RF_p/RF_n, respectively. Each pair of signals (LO_p/LO_n and RF_p/RF_n) may be generated, for example, by applying a positive offset and a negative offset to an incoming signal (the LO signal and the RF signal, respectively). It is contemplated that alternative techniques may be utilized to process the incoming signals in order to obtain the signal pairs, and once the signal pairs are obtained, they may be processed jointly by the double balanced mixer 310 to produce a pair of intermediate frequency (IF) signals (denoted as IF_p and IF_n).

Figure 5:
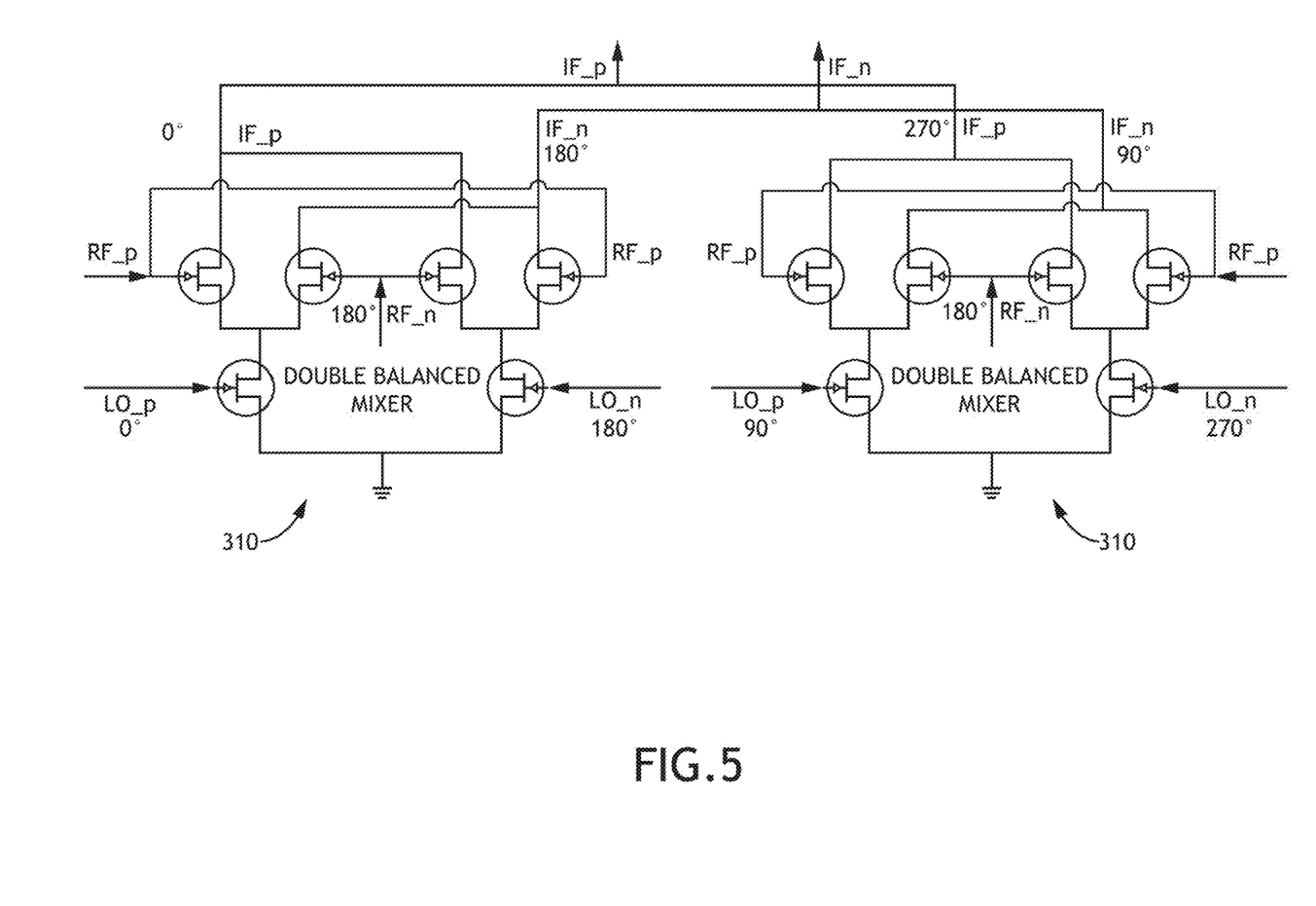
FIG. 5 is a schematic depiction of an exemplary polyphase four-path mixer according to an exemplary embodiment of the inventive concepts disclosed herein.

FIG. 5 is an illustration depicting the operations of two double balanced mixer 310 in an exemplary polyphase multipath mixer 300 configured to support a total of four paths. It is noted that the four paths may be 360°/4=90° apart from each other, and the precision adjustment of the nominal phase (e.g., 90°, 180° and the like) shifts made possible by the phase shifters 306/308 allows the four-path polyphase multipath mixer 300 to inherently provide improved harmonic cancellation for all even orders. The four-path polyphase multipath mixer 300 may also effectively cancel harmonic and image up to n−1 order (n being the number of paths; n=4 in the current example), which may be appreciated in various types of operating conditions.

Figure 6:
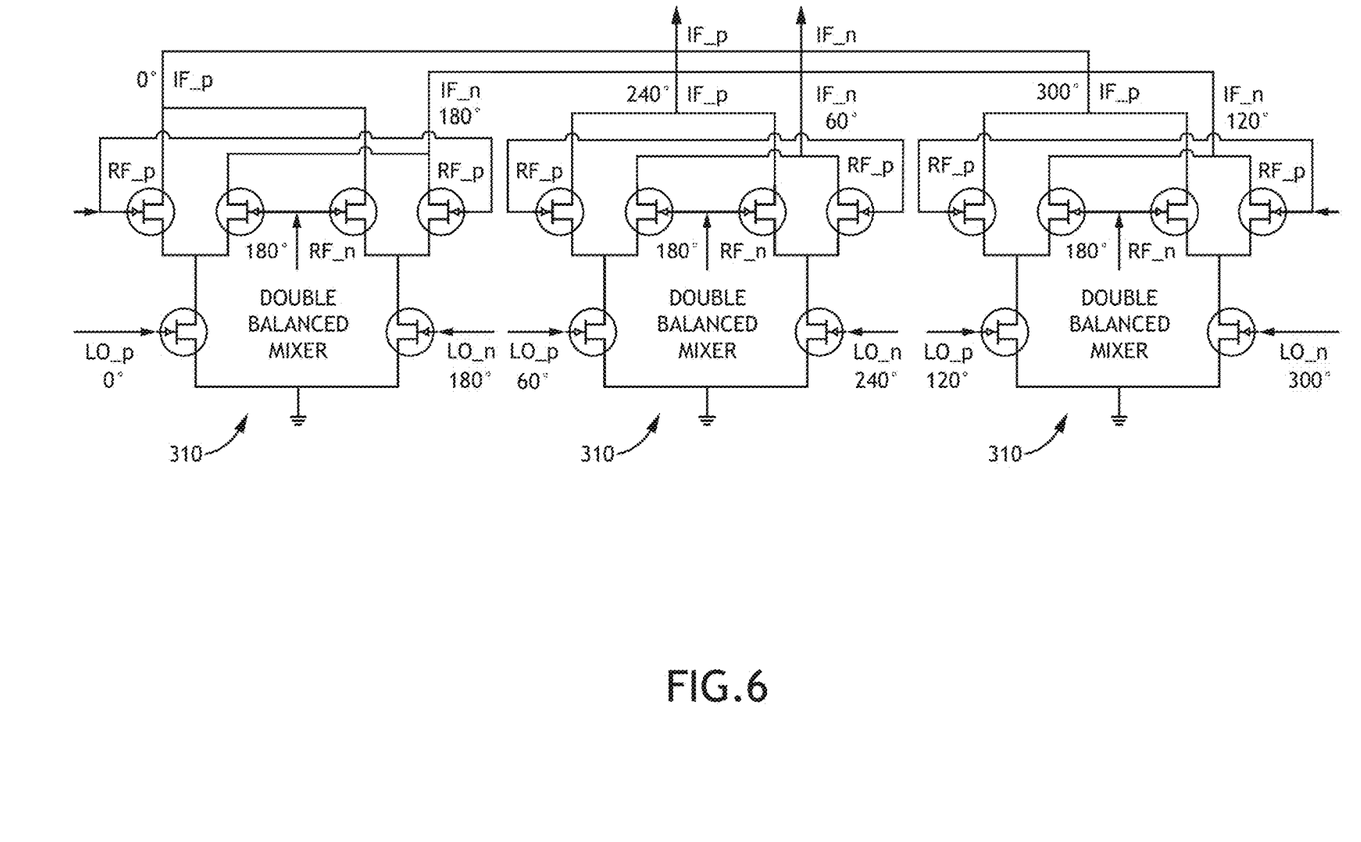
FIG. 6 is a schematic depiction of an exemplary polyphase six-path mixer according to an exemplary embodiment of the inventive concepts disclosed herein.

It is to be understood that the number of paths implemented in a given polyphase multipath mixer 300 is not limited to four. FIG. 6 is an illustration depicting another exemplary polyphase multipath mixer 300 configured to support a total of six paths. It is noted that the six paths may be 360°/6=60° apart from each other, allowing the six-path polyphase multipath mixer 300 to inherently provide harmonic cancellation for all even orders and image cancellation up to the $5^{th}$ order. It is contemplated that polyphase multipath mixers 300 implementing more than six paths may also be utilized without departing from the broad scope of the inventive concepts disclosed herein.

It is also contemplated that while the polyphase multipath mixers 300 described above are shown to convert RF signals to IF signals, similar polyphase multipath mixers may be configured to convert IF signals to RF signals. For instance, the data paths from the RF signal to the IF signal shown in FIG. 3 may be reversely configured to support conversion of IF signals to RF signals without departing from the broad scope of the inventive concepts disclosed herein.

It is contemplated that using the polyphase multipath mixers 300 in the active filter assemblies 100/200 configured in accordance with the inventive concepts disclosed herein may be beneficial because the polyphase multipath mixers 300 are capable of providing very high image rejections (e.g., 60 dBc to 80 dBc) without having to use image rejection filters, allowing the polyphase multipath mixers 300 to be implemented as broadband mixers. The polyphase multipath mixers 300 configured in this manner also tend to have very low local oscillator leakage, and they may effectively cancel up to n−1 order spurs, which may be appreciated in various types of operating conditions. Furthermore, using the polyphase multipath mixers 300 in the active filter assemblies 100/200 may effectively enable the active filter assemblies 100/200 to generate output signals with very low noise floors, and in certain implementations, using the polyphase multipath mixers 300 may allow the active filter assemblies 100/200 to facilitate full duplex signaling with transmit and receive signals in close proximity to each other.

Using the polyphase multipath mixers 300 configured in accordance with the inventive concepts disclosed herein may also alleviate the need for the second mixer 106/206 in certain active filter assemblies 100/200. In other words, using a polyphase multipath mixer as the first mixer 102/202 in an active filter assembly 100/200 may provide sufficient image and harmonic rejection so that the filtered signal (output of the filter 104/204) may be directly quantized by an analog to digital converter. It is therefore contemplated that the use of a second mixer 106/206 in an active filter assembly 100/200 may be optional, and whether to use the second mixer 106/206 may be determined based on operating conditions as well as various other factors without departing from the broad scope of the inventive concepts disclosed herein.

It is further contemplated that the various components of the polyphase multipath mixers 300 may be constructed using device technologies specifically chosen to further enhance the overall performance of the polyphase multipath mixers 300. For instance, the mixer 300 may be constructed on a monolithic platform such as complementary metal-oxide-semiconductors (CMOS), Silicon Germanium (SiGe) BiCMOS (an integration of bipolar junction transistors and CMOS), Gallium Arsenide (GaAs) Heterojunction Bipolar Transistors (HBTs) or the like. The polyphase multipath mixers 300 may also be constructed using a mixture of various device technologies to further enhance their overall performance. For example, the mixers 310 may be constructed using Gallium Nitride (GaN) or GaAs High Electron Mobility Transistors (HEMTs). Alternative device technologies, such as GaAs HBTs, Indium Phosphide (InP) HEMTs, InP HBTs, or SiGe BiCMOS, may also be utilized to construct the mixers 310. It is contemplated that the mixers 310 constructed using such device technologies may have enhanced power and dynamic range.

The phase shifters 306 and 308 may also be constructed using certain device technologies. It is contemplated that GaAs HEMTs, GaAs HBTs, InP HEMTs, InP HBTs, SiGe BiCMOS and/or SiGe CMOS may be suitable device technologies for constructing the phase shifters 306 and 308. It is also contemplated that Si/SiGe BiCMOS and/or SiGe CMOS may be suitable device technologies for constructing the various digital/analog control circuits 302, 304, and 312. It is to be understood, however, that the various device technologies listed herein are merely exemplary and are not meant to be limiting. It is contemplated that device technologies utilized to construct the mixers 310, the phase shifters 306, 308, and the various digital/analog control circuits 302, 304, and 312, may vary without departing from the broad scope of the inventive concepts disclosed herein.

As will be appreciated from the above, active filter assemblies utilizing the polyphase multipath mixers disclosed herein may provide filtering capabilities unobtainable using conventional filtering technologies. Improvements can be obtained in areas of low-jitter sources, full duplex operation, improved use of available spectrum, electronic warfare systems, optimal anti-alias filtering, as well as other applications including, but not limited to, cosite interference mitigation (e.g., for aircraft, ships, or ground stations) and narrowband filtering (e.g., for oscillators). The active filter assemblies configured in accordance with the inventive concepts disclosed herein may also be configured to operate in white space such as that available near high power Ultra High Frequency (UHF) television signals or the like.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form hereinbefore described being merely an explanatory embodiment thereof, it is the intention of the following claims to encompass and include such changes.

What is claimed is:

1. An apparatus, comprising:
   a first mixer comprising a polyphase six path mixer comprising three double balanced mixers and a second mixer both in communication with an oscillator;
   a plurality of filters positioned between the first mixer and the second mixer, a selected filter of the plurality of filters being selected based on an offset of a frequency of the oscillator and a first bandwidth or a second bandwidth of the plurality of filters;
   the first mixer being configured to convert a desired frequency band to a center frequency of the selected filter; and
   the second mixer being configured to reverse convert the filtered signal from the selected filter back to an original frequency,
   wherein:
     each path of the polyphase six path mixer is 60 degrees apart from the other paths; and
     the polyphase six path mixer provides even order harmonic cancellation.

2. The apparatus of claim 1, wherein the plurality of filters are coupled to a pair of switches.

3. The apparatus of claim 1, wherein the second mixer comprises:
   an oscillating signal distributor in communication with the oscillator, the oscillating signal distributor configured to generate a plurality of distributed oscillating signals across a plurality of path;
   a plurality of phase shifters configured to phase shift the plurality of distributed oscillating signals;
   a plurality of mixers configured to mix the plurality of distributed oscillating signals and an input RF signal to generate a plurality of IF signals; and
   the combiner configured to combine the plurality of IF signals into an integrated IF signal.

4. The apparatus of claim 3, wherein the oscillating signal distributor is constructed utilizing device technologies comprising at least one of: Silicon Complementary Metal-Oxide-Semiconductor (CMOS), Silicon BiCMOS, Silicon Germanium CMOS, and Silicon Germanium BiCMOS.

5. The apparatus of claim 3, wherein the plurality of phase shifters is constructed utilizing device technologies comprising at least one of: Gallium Arsenide High Electron Mobility Transistor (HEMT), Gallium Arsenide Heterojunction Bipolar Transistor (HBT), Indium Phosphide HEMT, Indium Phosphide HBT, Silicon Germanium Complementary Metal-Oxide-Semiconductor (CMOS), and Silicon Germanium BiCMOS.

6. The apparatus of claim 3, wherein the plurality of mixers is constructed utilizing device technologies comprising at least one of: Gallium Nitride High Electron Mobility Transistor (HEMT) and Gallium Arsenide HEMT.

7. The apparatus of claim 1, wherein the apparatus is adapted to function as a filter assembly in a radio device.

8. An apparatus, comprising:
   a first mixer and a second mixer both in communication with an oscillator;
   a plurality of filters positioned between the first mixer and the second mixer, a selected filter of the plurality of filters being selected based on an offset of a frequency of the oscillator and a first bandwidth or a second bandwidth of the plurality of filters;
   the first mixer comprising a polyphase six path mixer comprising three double balanced mixers being configured to convert an intermediate frequency (IF) input signal to a center frequency of the selected filter; and
   the second mixer being configured to convert the filtered signal from the selected filter back to an original frequency,
   wherein:
     each path of the polyphase six path mixer is 60 degrees apart from the other paths; and
     the polyphase six path mixer provides even order harmonic cancellation.

9. The apparatus of claim 8, further comprising:
   a pair of switches coupled to the plurality of filters.

10. The apparatus of claim 8, wherein the second mixer comprises:
    an oscillating signal distributor in communication with the oscillator, the oscillating signal distributor configured to generate a plurality of distributed oscillating signals across a plurality of path;
    a plurality of phase shifters configured to phase shift the plurality of distributed oscillating signals;
    a plurality of mixers configured to mix the plurality of distributed oscillating signals and an IF input signal to generate a plurality of RF signals; and
    a combiner configured to combine the plurality of RF signals into an integrated RF signal.

11. The apparatus of claim 10, wherein the oscillating signal distributor is constructed utilizing device technologies comprising at least one of: Silicon Complementary Metal-Oxide-Semiconductor (CMOS), Silicon BiCMOS, Silicon Germanium CMOS, and Silicon Germanium BiCMOS.

12. The apparatus of claim 10, wherein the plurality of phase shifters is constructed utilizing device technologies comprising at least one of: Gallium Arsenide High Electron Mobility Transistor (HEMT), Gallium Arsenide Heterojunction Bipolar Transistor (HBT), Indium Phosphide HEMT, Indium Phosphide HBT, Silicon Germanium Complementary Metal-Oxide-Semiconductor (CMOS), and Silicon Germanium BiCMOS.

13. The apparatus of claim 10, wherein the plurality of mixers is constructed utilizing device technologies comprising at least one of: Gallium Nitride High Electron Mobility Transistor (HEMT) and Gallium Arsenide HEMT.

14. The apparatus of claim 8, wherein the apparatus is adapted to function as a filter assembly in a radio device.

15. An apparatus, comprising:
- an oscillating signal distributor in communication with an oscillator, the oscillating signal distributor configured to generate a plurality of distributed oscillating signals across a plurality of paths;
- a plurality of phase shifters configured to phase shift the plurality of distributed oscillating signals according to a separation related to a number, n, of the plurality of paths, the separation being related to the number, n, of the plurality of paths by 360°/n;
- a plurality of mixers comprising three double balanced mixers organized into a polyphase six path mixer configured to mix the plurality of distributed oscillating signals and a radio frequency (RF) input signal to generate a plurality of intermediate frequency (IF) signals;
- a plurality of filters in communication with the plurality of mixers to filter the plurality of IF signals, a selected filter of the plurality of filters being selected based on an offset of a frequency of the oscillator and a first bandwidth or a second bandwidth of the plurality of filters; and
- a combiner in communication with the plurality of filters configured to combine the plurality of IF signals into an integrated IF signal, wherein:
- each path of the polyphase six path mixer is 60 degrees apart from the other paths; and
- the polyphase six path mixer provides even order harmonic cancellation.

16. The apparatus of claim 15, wherein the plurality of double balanced mixers are each configured to process a first path for at least one pair of the plurality of distributed oscillating signals and a second path for at least one pair of the RF input signal.

* * * * *